(12) United States Patent
Schulz et al.

(10) Patent No.: US 8,504,461 B1
(45) Date of Patent: Aug. 6, 2013

(54) FINANCIAL PRODUCTS FOR INCENTIVIZING HEALTH IMPROVEMENT

(75) Inventors: Kraig Schulz, Fairfield, CT (US); Chris Behling, Windham, NH (US)

(73) Assignee: Wellbeing Financial Corporation, Windham, NH (US)

( * ) Notice: Subject to any disclaimer, the term of this patent is extended or adjusted under 35 U.S.C. 154(b) by 0 days.

(21) Appl. No.: 13/224,262

(22) Filed: Sep. 1, 2011

Related U.S. Application Data

(60) Provisional application No. 61/379,338, filed on Sep. 1, 2010.

(51) Int. Cl.
*G06Q 40/00* (2006.01)
(52) U.S. Cl.
USPC .......................... 705/36 R; 705/37
(58) Field of Classification Search
USPC .................................. 705/4, 35–40
See application file for complete search history.

(56) References Cited

U.S. PATENT DOCUMENTS

2009/0055227 A1* 2/2009 Bakos .............................. 705/4

* cited by examiner

*Primary Examiner* — Thu Thao Havan
(74) *Attorney, Agent, or Firm* — Fenwick & West LLP

(57) ABSTRACT

A financial instrument, and associated systems and methods, provide direct financial incentives to individual investors to maintain and improve their health. The financial product has a base rate of return which is based on the investor's well-being category or other characteristics. The base rate of return is retrospectively adjusted at the end of the time period based on changes in the investor's well-being category, with improvements in well-being category typically resulting in an increased rate of return. A number of integrated analytic and predictive models are used to determine investor morbidity risk, the well-being categories, investor migration between categories, the investor payouts, and the portfolio allocation for investments underlying the financial instrument.

14 Claims, 5 Drawing Sheets

FINANCIAL PRODUCTS FOR INCENTIVIZING HEALTH IMPROVEMENT

RELATED APPLICATIONS

This application claims the benefit of the filing date of earlier filed U.S. Provisional Application 61/379,338 filed on Sep. 1, 2010, which is hereby incorporated by reference in its entirety for all purposes.

FIELD OF THE INVENTION

The present invention relates to financial products in healthcare and more particularly to financial products that incentivize individuals to maintain and improve health over time and methods of generating the same.

BACKGROUND OF THE INVENTION

Healthcare costs are a major concern for individuals, employers and governments at the local, state, and federal level. There are a wide variety of programs available that provide individuals, employers and governments various ways to directly control their healthcare costs, such as group health insurance, individual health insurance, healthcare savings accounts, and the like. These programs give individuals and organizations options to reduce, limit, or cap their costs through the purchase of insurance or saving for healthcare expenses in a tax advantaged manner. All of these programs focus on how healthcare expenses will be paid. But a majority of healthcare expenses could be avoided as they are associated with disease and morbidity that could be avoided.

Health insurers and other payers are beginning to focus more on how healthcare costs can be avoided by offering programs ranging from disease management to wellness and prevention. They are also beginning to attach financial incentives and penalties to insureds taking specific actions to improve their health or to actually improving their health. For example, the Affordable Care Act (H.R. 3590) which passed in March of 2010, expands the ability of insurers to use incentives and penalties to incentivize desired behavior or desired health outcomes. All of these programs, however, are limited by several factors including: (1) They are limited in their timeframes, with most incentives and penalties associated with behaviors or outcomes in a 12 month plan year, (2) they are limited in size, with most incentives ranging from a few dollars to a few hundred dollars, (3) they are generally focused on process instead of outcomes, with the incentives being linked to members taking actions like completing Health Risk Assessments, joining a gym, or getting an annual physical, instead of being linked to actual improvements in the insured's health.

There are also a seemingly infinite variety of ways for individuals to take actions to improve their health on their own, ranging from routine health checkups and screenings to memberships in health clubs and fitness centers; from simply walking thirty minutes a day to elaborate, personalized diet and exercise regimes; from quitting smoking to eating healthier, more natural foods. But these approaches do not provide any direct or near term financial benefit for the individual. While these actions may well result in improved health, decreased morbidity, and lower healthcare expenses, the financial benefit is not immediate or even near term. Further, the apparent "rewards" for not following a good health regime seem to be great as evidenced by the epidemic of chronic (largely preventable) diseases stemming from these behaviors including obesity, arthritis, some types of cancer, type-2 diabetes, sleep apnea, and so forth. In addition, the financial benefit is often in the form of avoided healthcare expenses which are very indirect and provide less of an incentive. In short, these approaches do not provide any direct financial benefit to the individual for improving their health during specific periods based on particular measure of health outcomes.

SUMMARY OF THE INVENTION

In one embodiment, the present invention comprises methods and systems for providing financial products that directly offer specific financial incentives to individuals to maintain and/or improve their health over specific time periods, using particular measures of health.

A financial product (equivalently "financial instrument") in accordance with one embodiment of the invention is purchased by the individual (also called the "investor") for a specific period of time for a principal amount. Without loss of generality the financial product is referred to herein as a "Well-being Bond," and it is specifically noted the financial product is not limited to a bond instrument. At the time of investment, some set of health measures are taken for the investor. The health measures are preferably selected to be both manageable by the investor and objectively measurable. In one embodiment, the health measures are used to classify the individual investor into a particular category of health risk, sometimes called a "well-being category." For example, three well-being categories of "green" (e.g. above average health), "yellow" (e.g., average health), and "red" (e.g., below average health) can be used. Well-being categories can be generic to all investors, or specific to the investor's demographics (e.g. age, gender, location, etc.).

Measures of the investor's health are taken at the time of the investment and then again either at end of the time period, or periodically over the time period. Each time the health measures are updated, the investor can be placed in an updated well-being category based on their updated health measures, and their demographics at the time of measurement, if applicable. As a result, investors will either remain in the same well-being category or migrate between categories (e.g. "green" to "yellow" or "yellow" to "red.")

The financial product has a base rate of return. The base rate of return can be fixed or variable and can be different for each well-being category or other factors associated with individual investors (e.g., demographics, employment status, etc.). This base rate of return is adjusted (increased or decreased) based on improvements or deteriorations in the investor's health status over the time period, as measured by the predetermined health measures and shown by the migration of the investor between the well-being categories. Using the updated health measures, resulting well-being categorization and movement between categories, the base rate of return is adjusted and applied retrospectively to the investor's principle balance. The adjusted rate of return can be applied to the entire principle balance or a portion thereof (e.g., 50%); also the adjusted rate of return can be applied for only a portion of the time period of the investment (e.g., the last year).

In one embodiment, if the investor's health improves (or at least does not decline), during the period, then the investor receives an increased rate of return relative to the base rate. If the investor's health declines, then the investor receives a decreased rate of return. In this fashion, the investor has the ability to directly impact the rate of return of the financial product by maintaining or improving their health.

In one embodiment, the updated health measures are used to determine a current well-being (i.e., health risk) category. Depending on the health outcomes to be incentivized, different amounts of positive or negative adjustments to the base rate of return can be associated with different changes between the initial well-being category and the current well-being category (or interim categories). Generally, an improvement in well-being category is associated with positive adjustment in the rate of return, and a decline in well-being category is associated with a negative adjustment in the base rate.

The financial product and the above described process operate in conjunction with a set of computer-implemented analytical and predictive models. The models are integrated by having the outputs of certain one of the models being used as inputs to the other models. This integration results in a dynamic system that seeks an optimal relationship between the definition of the well-being categories, the base rate of return and the rate adjustments, the migration of the investors between categories, and the expected performance of the underlying portfolio of investments made with the investors' capital. In one embodiment, these models comprise the following:

Morbidity Risk Model: this model uses a finite set of health measures that are both manageable and objectively-measurable to determine morbidity risk for each investor (e.g., an investor has high risk for future morbidity based on his/her body composition, blood pressure, smoking status, etc.)

Risk Classification Model: this model classifies each investor into one of the well-being categories (e.g., green, yellow, red), based on the morbidity risk determined by the morbidity risk model.

Morbidity Migration Model: this model predicts changes in the distribution of investors in each well-being category over the time period of the financial product; the migration of individual investors being categories being a result of improving or deteriorating health measures.

Portfolio Allocation Model: this portfolio allocation model uses historical and anticipated asset returns and correlations to establish a portfolio of investments that can be expected to yield a rate of return that is a) within a predetermined risk tolerance level and b) higher than the rate of return that will be paid out to investors.

Investor Payout Model: this model calculates a health-adjusted rate of return and payout schedule based on the base rate, adjusted by the investor's movement between well-being categories.

As mentioned above, in one embodiment these models are integrated into an operative system, which transforms information about health measures of individual investors, individual and population migration between health categories, and asset information for a portfolio of investment assets into a set of specific parameters (e.g., rates of return, well-being category boundaries) from which a financial product can be offered with expected return and risk outcomes. Each of these models is implemented as a computer implemented algorithm that receives specific input variables and generates specific outputs.

A financial product in accordance with the present invention can be offered in a number of different forms.

Further provided are non-transitory computer-readable storage medium storing executable code for implementing the disclosed systems and methods.

In view of the foregoing, it can be appreciated that the present invention includes a financial product having a rate of return based on an investor's health status, the computer programs and computer implemented models as described above, computer systems configured to store and manage investor account data and implement the models, as well as various business operations to offer and service the financial product.

The features and advantages described in this summary and the following detailed description are not all-inclusive. Many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
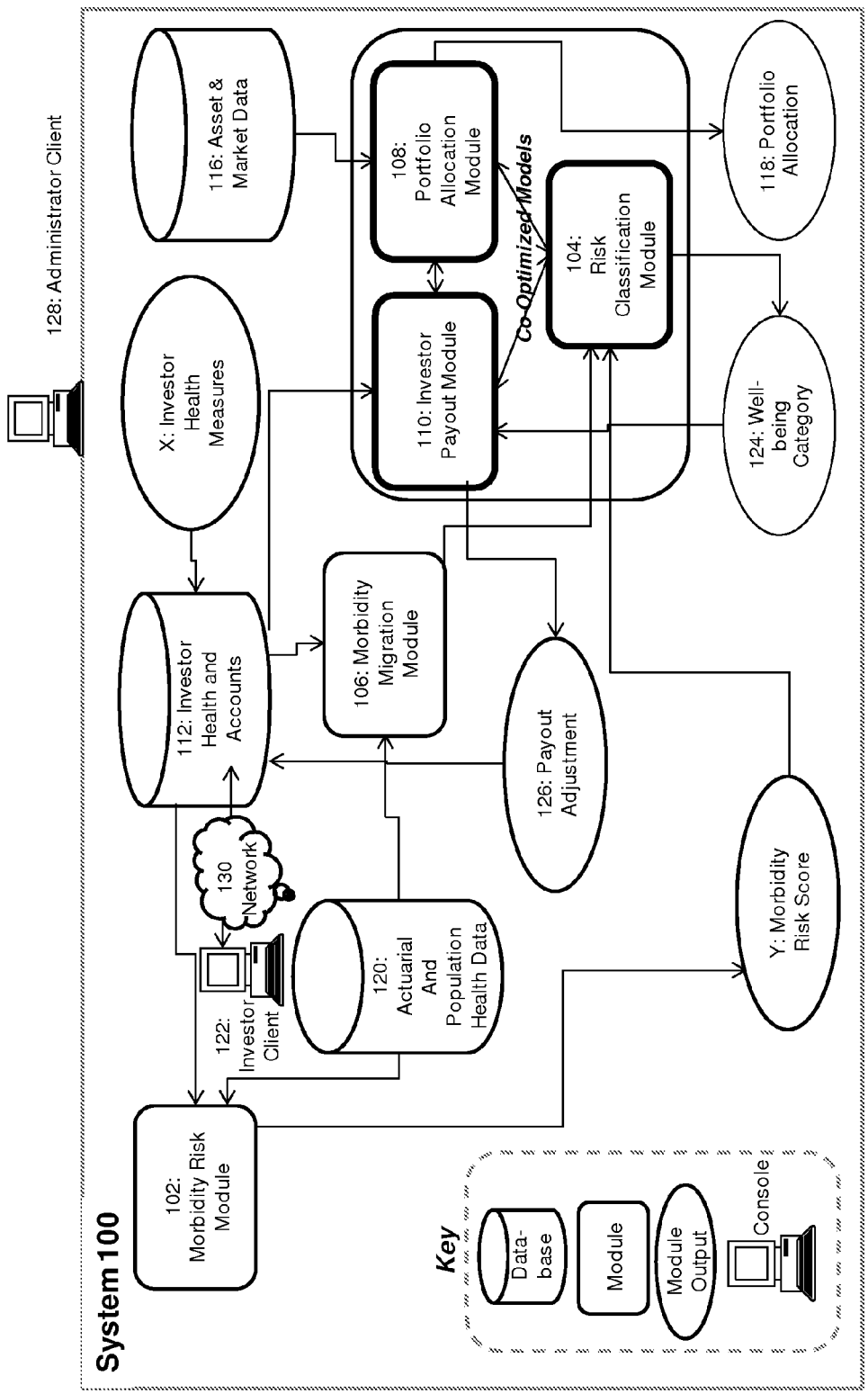
FIG. 1 is block diagram of the architecture of a computer system for implementing one embodiment of the present invention.

FIG. 1 is a high level block diagram of the architecture of the system 100 according to one embodiment. The system 100 communicates with client 122 via a network 130.

The system 100 is implemented using a computer system comprising a single computer, or a network of computers, including cloud-based computer implementations. As used herein, a "computer" is understood to mean a hardware device including at least one processor, a memory configured for storing computer executable programs and data, a storage device for persistent storage of programs and data, a bus for communicatively coupling the processor(s), memory, storage, and associated physical and programmatic interfaces for input devices, output devices, and network connectivity. Generally, the computers are preferably server class computers including one or more high-performance CPUs and 1G or more of main memory, as well as 500 Gb to 2 Tb of computer readable, persistent storage, and running an operating system such as LINUX or variants thereof. The operations of the system 100 as described herein can be controlled through either hardware or through computer programs installed in the storage and executed by the processors of such servers to perform the functions described herein. The system 100 includes other hardware elements necessary for the operations described here, including network interfaces and protocols, input devices for data entry, and output devices for display, printing, or other presentations of data. As is apparent, the various data processing operations described herein are sufficiently complex and time consuming as to require the operation of a computer system such as the system 100 in order to practice embodiments of the invention. The system may be implemented via a combination of hardware and software, as described, or entirely in hardware elements.

The system 100 includes a morbidity risk module 102, a risk classification module 104, a morbidity migration module 106, a portfolio allocation module 108, and an investor payout module 110 as described herein. The system 100 further includes data stores of investor health measures and accounts 112, asset and market data 116 and actuarial and population health data 120. For simplicity only one of each component of the system 100 is shown but in practice multiples of each may be in operation.

The administrator client 128 is the interface to the system 100 for a system administrator to set up the various modules for operation, run periodic updates on the modules, generate reports, establish investor accounts, update and implement the changes to the portfolio as indicated by the portfolio allocation module 108, and otherwise manage the operation of the system 100. The administrator client 128 also enables the system administrator to access outside information (e.g., health measure and risk information) from other resources (e.g., those available from public or private databases), and enter that information into the various data stores. The administrator client 128 would typically be implemented on a secure computer within the secure networking environment hosting various models and data stores. The administrator client 128 may also access the system 100 through the network 130 with the use of secured connection such as a virtual private network, for example.

The investor client 122 is the interface to the system for an investor to access the investor's particular investor account in the investor health and accounts 112. The investor uses the client 122 to obtain current account information, such as account balance, current well-being category 124, current health measures X, financial performance of the underlying portfolio, as well as to perform account updates, such as additional contributions, investments, or withdrawals. Access is provided by a network 130 (e.g., over the Internet) using secure protocols. The investor client 122 is preferably implemented as a software interface (e.g., web client) executed on a computer device accessible to the typical investor (e.g., personal computer, smart phone, tablet computer or the like). Other clients can be readily implemented as needed to support access by additional parties, such as sellers or servicers of the financial products (e.g., banks, insurance companies or the like), each with the requisite security controls (which data and accounts can be accessed) as well as querying and report generating capabilities.

The investor health and account database 112 stores information about health measures and morbidity factors for each investor as gathered over time. It also stores each individual investor's account information as well as the personal information for each investor, links to their health information, information about the inventor's purchases (e.g., dates of purchase, amounts, contributions, adjustments) and so forth. The investor's health measures (denoted below as $X_n$) are generally taken at the time of the investment (e.g., within one month before or after the investor deposits the principle balance), and at least again at the end of the investment period (e.g., within one month before or after termination); measurements may also be taken periodically (e.g., yearly) during the investment period. The health measures may include weight, body mass index (or other measures of body composition), cholesterol levels, blood glucose levels, blood pressure, or smoking status.

The asset and market data 116 stores information about the performance, risk, volatility and other financial characteristics of assets being used or considered for use by the portfolio allocation model 108. The asset and market data 116 can be proprietary to the system 100 or data provided by third party vendors, or a combination thereof.

The actuarial and population health data 120 stores historical health data about large populations. This data is similar to that which may be used by life insurance companies and includes data from, for example, research studies and published surveys. The actuarial and population health data 120 can be proprietary to the system 100 or data provided by third party vendors, or a combination thereof.

Figure 2:
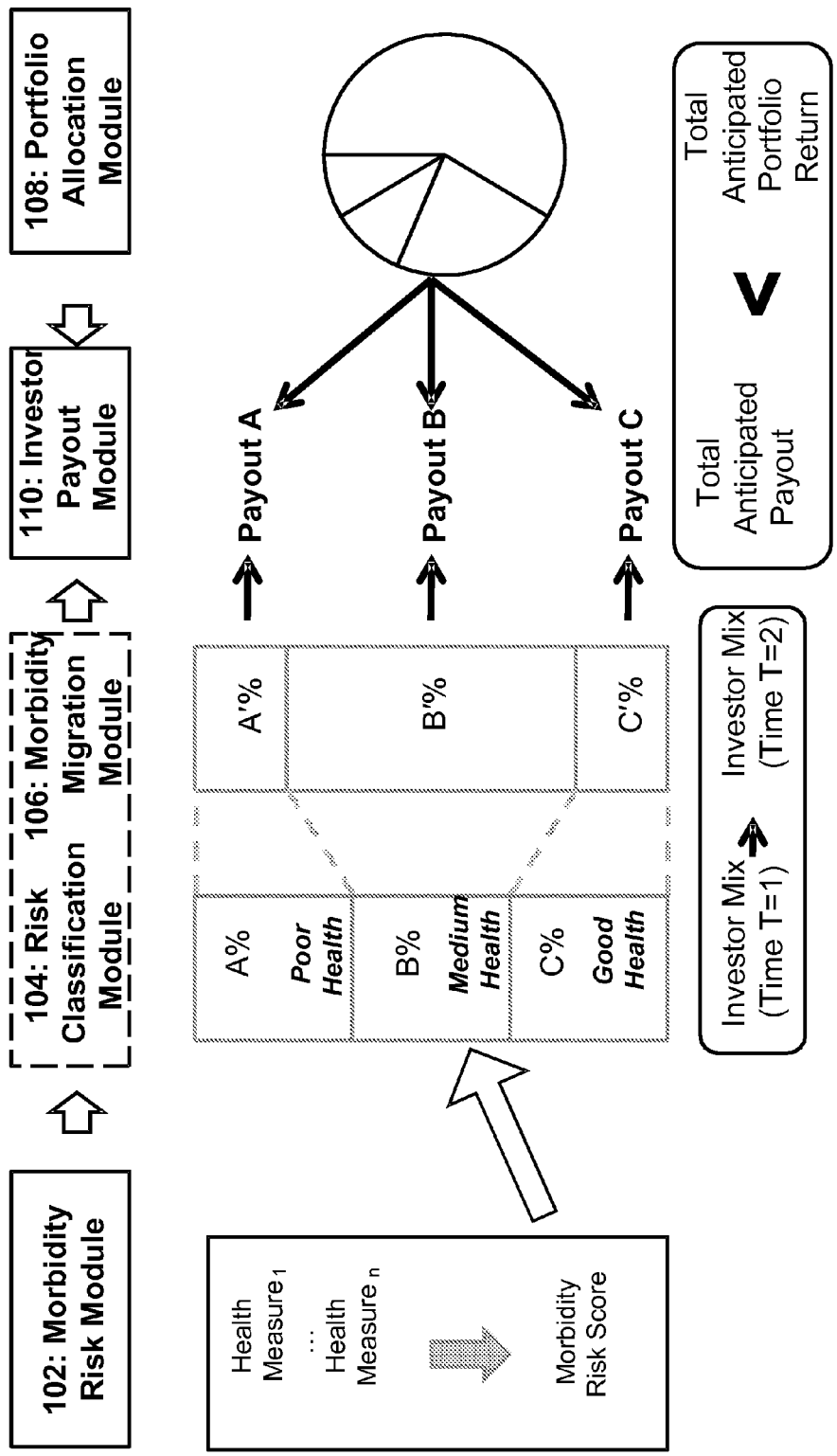
FIG. 2 illustrates the inter-relationship of the modules of the system according to one embodiment.

Referring to FIGS. 1 and 2, an overview of the working of the system 100 and its modules in determining payouts to investors is described. The morbidity risk module 102 uses health measures X of investors stored in the investor health and accounts 112 to determine a morbidity risk score Y for investors using the morbidity risk module 102. The morbidity risk score Y is a measure of morbidity over a given period of time. The morbidity risk score Y can be expressed as a number, class or a percentage. In one embodiment, the morbidity risk score Y is a discrete variable. An investor's morbidity risk score Y is determined at the time of investing and then at time points after the investment when returns to be paid to the investor are determined. Thus the investor's return is tied to the progression of the investor's health during that investment period.

The morbidity risk module 102 uses actuarial and population health data 120 to select measures used in the morbidity risk model (i.e., which health measures are most predictive of future morbidity risk). The morbidity risk module 102 selects for measures that are manageable by the investor, impact morbidity risk and are objectively measurable. Examples of such health measures include blood pressure, body composition, smoking status, cholesterol. In one embodiment, the measures used vary based on the age and gender of the investor.

The morbidity risk module 102 also determines the parameters for each measure in the model. Parameters for each measure in the model are developed using standard analytical methods (e.g., regression analysis, machine learning, etc.). In one embodiment, the parameters used for each measure vary based on age and gender of the investor.

Existing models for determining morbidity risk can be used. Examples include the Framingham Heart Study and the work of Dr. D. Edington at the University of Michigan, e.g., Edington, *Emerging Research: A View from One Research Center*, American Journal of Health Promotion May/June 2001, 15(5): 341-349. For the purposes of this system, it is not necessary that the model precisely determine morbidity risk. A useful morbidity risk model need only incorporate manageable and measurable risk factors that impact health and morbidity. An example model is:

$$Y = \beta_0 + \beta_1 X_1 + \beta_2 X_2 + \ldots + \beta_n X_n + \epsilon$$

wherein:

$\beta_n$ = an 1×n vector of 'weights' which could be calculated using any of several methods $X_n$ = an m×n matrix of investor health measures wherein:
m = number of investor health measures used in the calculation
n = number of observations used in the analysis=
$\epsilon$ = an error term The $\beta$ vector could be identified by the regression formula $\beta = (X'X)^{-1} X'Y$. The Y variable could be further segmented into a classification system (e.g., low, medium, high) to characterize a given investor's risk status and provide a starting point for the analysis by the risk classification module 104 where the investors are categorized into well-being categories.

Figure 3:
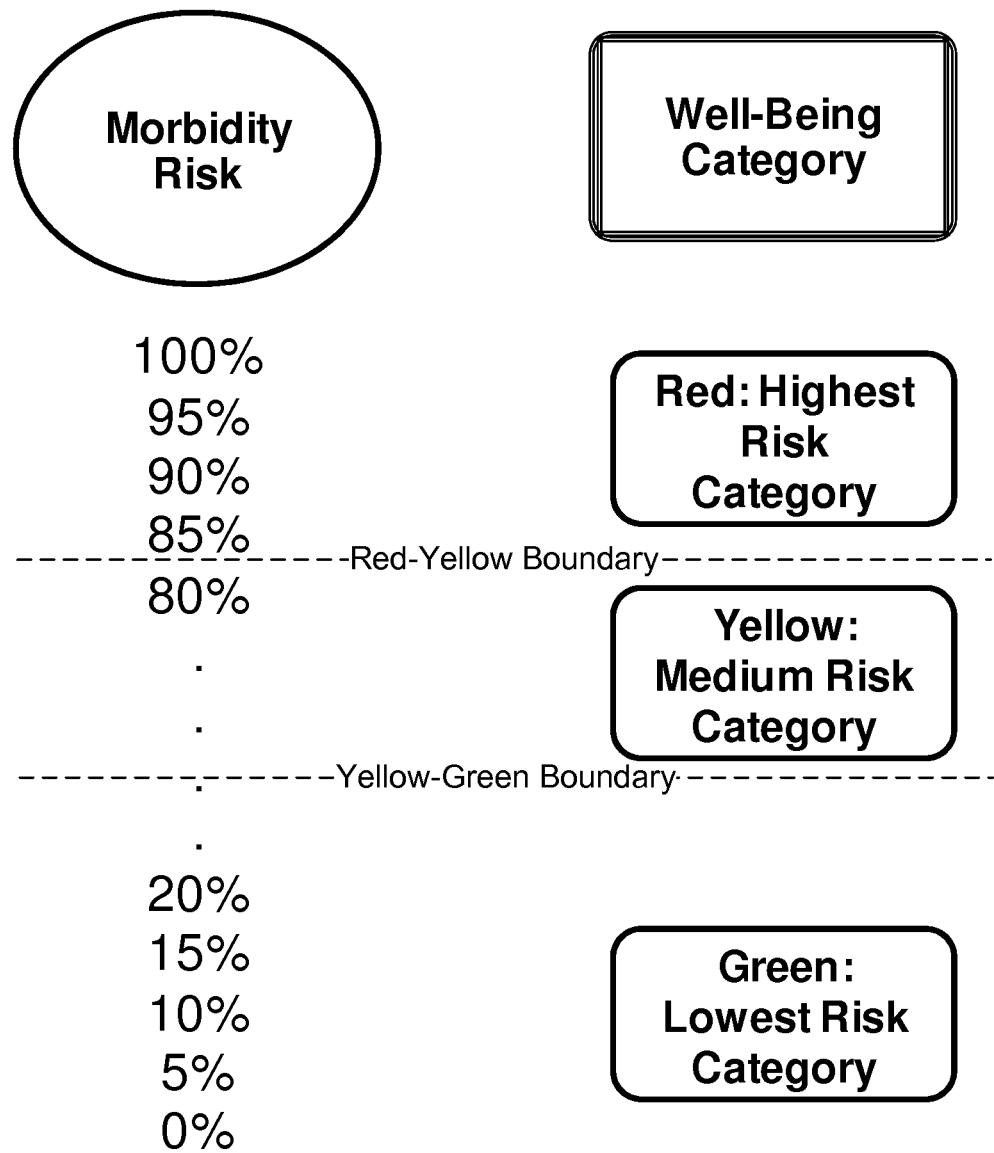
FIG. 3 illustrates the division of morbidity risk scores into well-being categories.

A well-being category 124 is then determined for the investors by the risk classification module 104 based on the morbidity risk score Y for the investor. The well-being category 124 for the investor is determined at investing and also at the predetermined time points after investing. The risk classification module 104 uses a risk classification model to determine thresholds between well-being categories. In the example illustrated in FIG. 2, there are three well-being categories, "good health," "medium health" and "poor health." Any number of well-being categories can be used and any number of labels are possible depending on administrative and marketing needs. FIG. 3 illustrates how the morbidity risk scores divide into three well-being categories 124 according to one embodiment. During the optimization of the system, the thresholds between categories 124 are modified based on the predicted movement of investors across categories as determined by the morbidity migration module 106, the payout adjustments 126 determined by the investor payout module 110 and portfolio allocation 118 determined by the portfolio allocation module 108.

Figure 4:
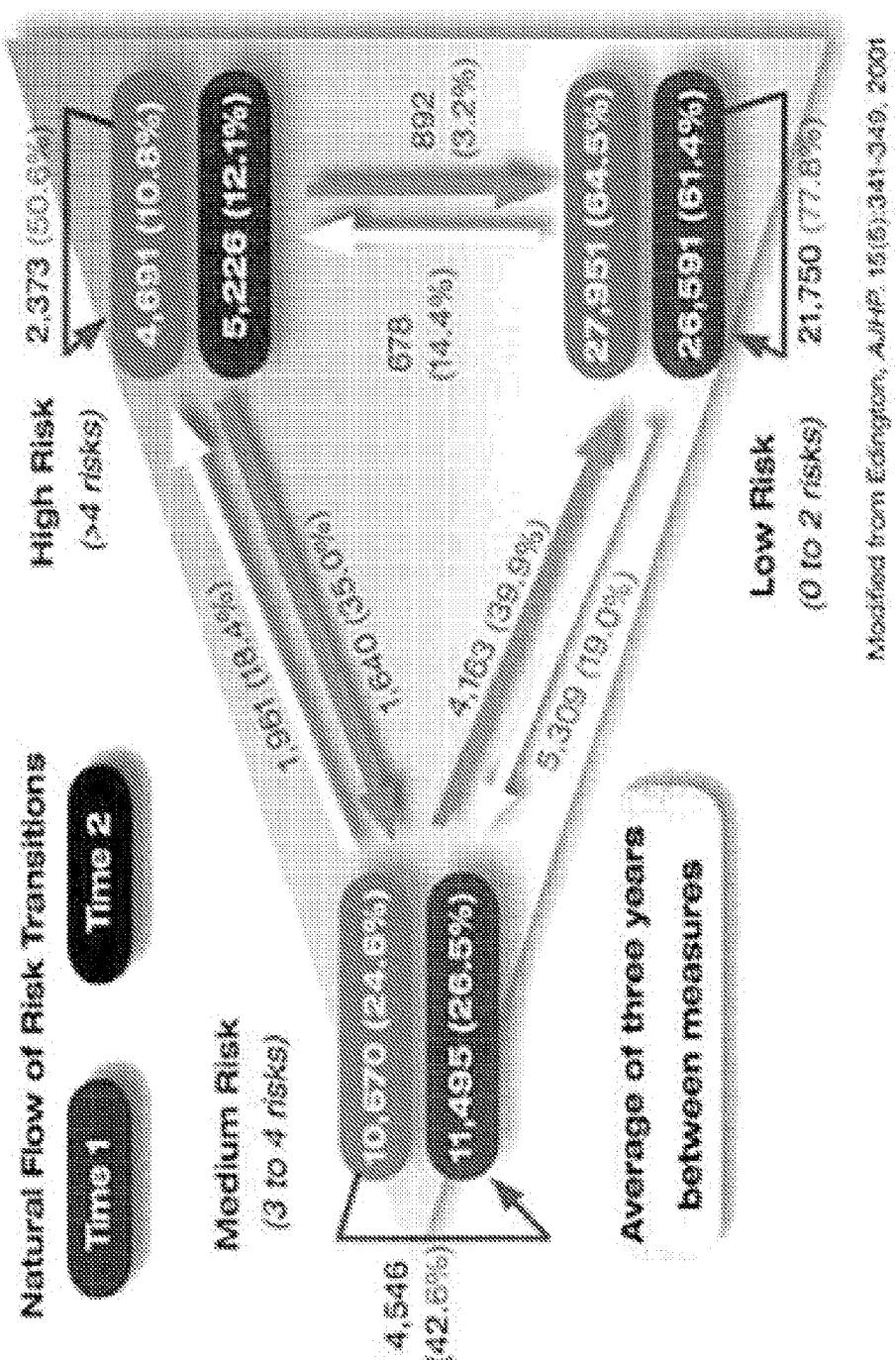
FIG. 4 is a relationship diagram showing an example of risk transition statistics.

It is the goal of the instrument that investors move to improved well-being categories 124 and that those in the highest well-being category 124 remain there. Thus, it is expected that investors will move between well-being categories 124 over time. In order to have sufficient investment returns to pay out to investors their returns based on their health outcomes (based on whether their health improved, stayed the same or got worse), an estimate must be made of how the investors are likely to progress over time. The morbidity migration module 106 predicts the individual and aggregate movement of investors between well-being categories 124 across time reflecting changes in morbidity risk using the morbidity migration model. The morbidity migration model is created by the morbidity migration module 106 using longitudinal data. FIG. 4 illustrates one example model. The model is based on the results from the above referenced Edington study by showing the change in the distribution (in terms of numbers and percentages) of persons transitioning (migrating) between high risk, medium risk, and low risk groups, based on health measurements taken three years apart. In one embodiment, the morbidity migration model is updated as additional data about morbidity in populations becomes available.

The morbidity migration model uses age, gender and other demographics as well as health measures X of the individual investors to predict the movement of individual investors between well being categories. These predictions for individual investors are aggregated to predict overall movement of the group of investors between well-being categories 124. Table 1 illustrates an example of predicted movement. For example, of the investors classified as "green" (low risk) at time 1, at time 2 70% are predicted to still be green, 20% "yellow" (medium risk) and 10% "red" (high risk).

TABLE 1

Expected Population Migration between Risk Groups

|  |  | TIME 2 | | |
| --- | --- | --- | --- | --- |
|  |  | Green | Yellow | Red |
| TIME 1 | Green | 70% | 20% | 10% |
|  | Yellow | 40% | 40% | 20% |
|  | Red | 5% | 35% | 60% |

Morbidity migration prediction is used to determine a portfolio allocation and payouts to investors such that there are sufficient funds to make payouts to investors. Returning to FIG. 2, there were roughly equal numbers of investors in the three well-being categories 124 at time T=1. According to the morbidity migration model, the population of each category shifts to the distribution shown for time T=2.

Using an investor payout model, the investor payout module 110 determines the base rate of return (including whether it will be fixed or variable) and the payout adjustments 126 to the base rate of return based on the improvements or deteriorations in the investor's health during the investment period. In one embodiment, the base rate is pegged to a market index such as the 30-year U.S. Treasuries, S&P 500, etc. Additionally or alternatively, the base rate for an investor is also part determined in part by the initial well-being category of the investor.

Generally, an improvement in well-being category 124 is associated with a positive payout adjustment 126 to the base rate of return, and a decline in well-being category 124 is associated with a negative payout adjustment 126 to the base rate. Where the initial measurements and/or categorization indicated generally good health for the investor, then maintaining that level of health (e.g., no change in the well-being category), can be associated with a positive payout adjustment 126 to the base rate of return. However, where the initial measurements and/or category indicated generally poor health for the investor, then maintaining that level of health can be associated with a negative payout adjustment 126 to the base rate of return.

Table 2 provides an example of payout adjustments 126 to the base rate that will be paid out to investors based on their health changes during the investment time period (starting at time 1 and ending at time 2). Investors who are classified in well-being category 124 green at time 1, receive the base rate+0.5% return at time 2 if at time 2 they still qualify for that category. If the "green" investor has deteriorated to well-being category 124 yellow, that investor receives (base rate of return−0.5%). If the "green" investor has deteriorated all the way to well-being category 124 red, that investor receives (base rate of return−1.0%).

TABLE 2

Example Adjustments to Base Rate of Return for Risk Migration

|  |  | TIME 2 | | |
| --- | --- | --- | --- | --- |
|  |  | Green | Yellow | Red |
| TIME 1 | Green | +0.5% | −0.5% | −1.0% |
|  | Yellow | +0.5% | 0.0% | −1.0% |
|  | Red | +1.0% | +0.5% | −1.0% |

Other sets of adjustments are possible to encourage different health behaviors. An example set of payout adjustments 126 to encourage maintenance of an investor's health is provided in Table 3. For a health insurance company or employer trying to keep healthcare costs down, just encouraging people to maintain their health (e.g., not get less healthy) pays off in reduced costs over time. In this example, for those investors staying in the same risk category, e.g., "green" to "green" and "yellow" to "yellow", the payouts are high relative to movements up across well-being categories 124 (e.g., yellow to green). Additionally, declines (e.g., yellow to red) are heavily penalized.

TABLE 3

Example Adjustments to Base Rate of Return to
Incentivize Maintaining Acceptable Level of Health Risk

|  |  | TIME 2 | | |
|---|---|---|---|---|
|  |  | Green | Yellow | Red |
| TIME 1 | Green | +0.5% | −0.5% | −1.0% |
|  | Yellow | +1.0% | +0.5% | −1.5% |
|  | Red | +2.0% | +1.5% | −2.0% |

An example set of payout adjustments 126 to encourage improving those with poor health is provided in Table 4. One rationale for this approach is that many of the investors are likely to be in the red category upon initiation and giving them large incentives at the outset will instill beneficial behaviors early on. Payments for movements up across well-being categories 124 are high relative to maintaining a well-being category.

TABLE 4

Example Adjustments to Base Rate of Return to
Incentivize Reducing Level of Health Risk

|  |  | TIME 2 | | |
|---|---|---|---|---|
|  |  | Green | Yellow | Red |
| TIME 1 | Green | +0.5% | −0.5% | −1.0% |
|  | Yellow | +1.0% | +0.5% | −1.5% |
|  | Red | +2.0% | +1.5% | −2.0% |

The adjusted rate of return, which may be compounded, for an investor is applied retrospectively to the investor's principal balance since the last health measures were taken from which morbidity risk score and well-being category 124 were determined. The adjusted rate of return can be applied to the entire principle balance or a portion thereof (e.g., 50%); also the adjusted rate of return can be applied for only a portion of the time period of the investment (e.g., the last year). These two controls on the application of the adjusted rate can be independently controlled and/or combined. The base rate of return and/or the adjusted rate of return can also be adjusted for pre-existing health conditions (e.g., cancer) or unforeseen events including accidents. These modifications to the financial instrument's parameters could also be accounted for by changing the interval between health measures, changing the boundaries between well-being categories 124 or other such means.

The amount of time between time 1 and time 2 can be any amount of time based on administrative and marketing needs. In one embodiment, health measures and returns are paid every 3 or 5 years. Alternatively, the health measures are taken more frequently such as every 3 months, 6 months or annually. In one embodiment, financial products of varying lengths of time are available to investors. For example, a higher increase over the base rate may be offered for financial products with shorter investment periods, thereby incentivizing investors to act aggressively to improve their health status.

The investor payout module 110 determines the amount that is needed to pay out returns to investors at time T=2 assuming the particular distribution of investors determined by the morbidity migration module 106. Then the portfolio allocation module 108 determines a portfolio allocation 118 that will provide the necessary returns to pay investors their returns. Preferably, the portfolio allocation 118 returns more than the amount necessary to pay returns to investors as there are administrative costs to running the system and a profit to be earned, if the system is managed by a for-profit entity. In an embodiment where the system is used by a non-profit, revenues beyond those needed for administrative costs are not necessary.

Figure 5:
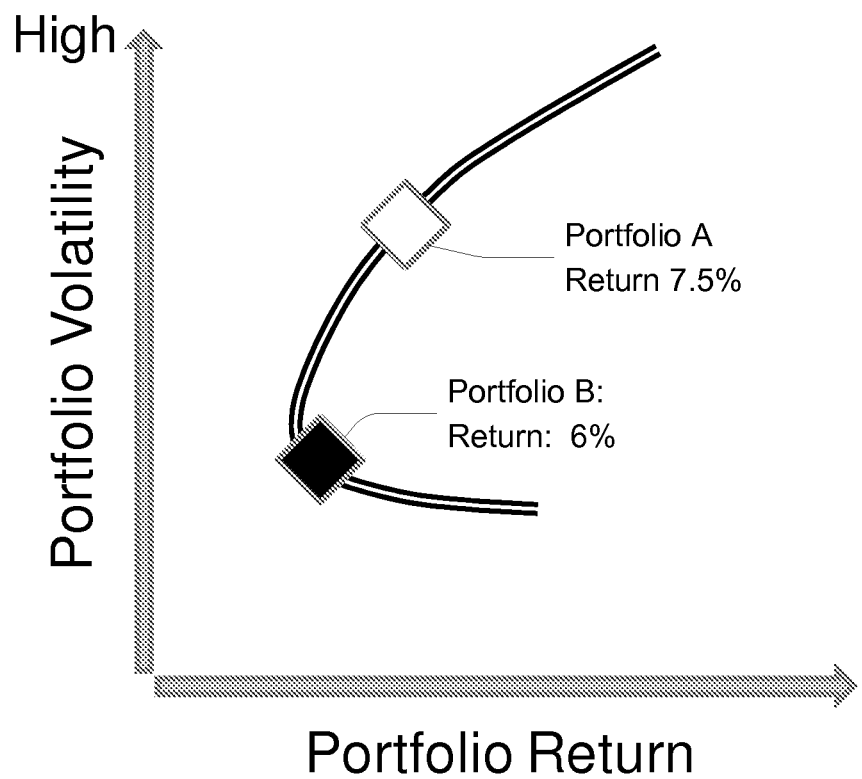
FIG. 5 illustrates two possible portfolio allocations for the investors' capital and their respective returns and volatilities.

The portfolio allocation module 108 uses historical and anticipated asset returns and correlations to identify a portfolio of investments, the portfolio allocation 118, that can be expected to yield returns that are higher than the average returns paid to investors. The identified portfolio yields such a return with a probability (i.e., volatility) that matches the company's risk profile (e.g., the portfolio must yield 6% returns over 5 years with a 95% confidence). FIG. 5 illustrates the interplay between returns and probability of returns. A hypothetical portfolio A consisting of 75% US equities, 20% US Treasury Bonds and 5% U.S. Real Estate may be expected to yield 7.5% returns on average over the next 5 years—but only yields at least this rate of return 50% of the time (the remaining 50% of the time returns are lower). A different allocation in portfolio B reduces the allocation to U.S. Equities to 60% and increases the allocation to U.S. Treasury Bonds to 20%, making the expected returns fall to 6% (still above the anticipated payout to the investor pool) but achieves this rate of return 95% of the time. Any known portfolio allocation model or investment theory can be used to determine the portfolio allocation 118.

It should be noted that the system 100 can be configured to set up and support multiple different instances of financial products (e.g., the well-being bonds) each with different (or potentially overlapping) portfolios of assets, and operating with different time period of investment, base rates of returns, adjustments, and other model parameters, and thus targeting different investor populations.

Example Portfolio Allocation

An exemplary portfolio allocation model uses historical (or anticipated) asset returns and correlations to identify a portfolio of investments that can be expected yield Y % returns (assumed to be greater than the X % guaranteed rate of return) over a given period of time with a Z % confidence interval (where Z can be adapted to the risk tolerance of the sponsoring organization). There are countless investment portfolio designs which one could rely on to construct a portfolio that meets the above requirements including Markowitz's "Modern Portfolio Theory" (MPT), Arbitrage Pricing Theory (APT), etc.

MPT is a form of portfolio diversification which seeks to minimize risk for a given level of returns in a portfolio by allocating assets to different investment types (e.g., bonds, domestic stocks, etc.). In matrix form, for a given "risk tolerance", the efficient frontier is found by minimizing the following expression:

$$w^T \Sigma w - q * R^T w$$

wherein:
 w is a vector of portfolio weights and
 $\Sigma w_i = 1$. i (The weights can be negative, which means investors can short a security.);
 $\Sigma$ is the covariance matrix for the assets in the portfolio;
 $w^T \Sigma w$ is the variance of portfolio return;
 $R^T w$ is the expected return on the portfolio;
 q is a "risk tolerance" factor, where 0 results in the portfolio with minimal risk and results in the portfolio with maximal return; and
 R is a vector of expected returns.

The range of "most efficient portfolios" is calculated by repeating the optimization for various $q \geq 0$. Many software packages, including Microsoft Excel, MATLAB, Mathematica and R, provide optimization routines suitable for the above problem.

Typical assets used in this kind of analysis include fixed income index funds (e.g., T-Bills), domestic stock indices (e.g., S&P 500), international stock indices (e.g., MSCI World Index), alternative investments (e.g., Dow Jones Hedge Fund Balanced Portfolio Index), real estate (e.g., Dow Jones U.S. Real Estate Index), insurance products, etc.

The investor payout model, the portfolio allocation model, and the risk classification model are co-optimized to determine a portfolio allocation, the well-being category 124 boundaries, and the payout adjustment to be applied to each investor's account. The models can be considered to be "jointly solving" a problem where the answer is an investment product that is attractive to investors and profitable for the entity offering the product. The interrelationship of the models and the need to jointly solve them in order to provide an optimally structured Well-being Bond arises as follows. As noted above, the payout models describe how much of a payout adjustment 126 to the base rate of return is provided to those who migrate between well-being categories 124. The payout model operates with a set of assumed boundaries between these categories 124 and with the expected returns by the portfolio allocation 118, and then determines what the rate of return adjustment should be for each combination of categories (e.g., migration from green to green, green to yellow, etc.). If for example, the boundary between the yellow and green well-being categories 124 (average and above health) is shifted (that is the morbidity risk thresholds are changed) so that it is easier for someone to move from the yellow to green category 124 (that is improve their health and thus reduce their health risk), then the overall percentage of investors who migrate from the yellow to the green category 124 can be expected to increase. As a result, the overall payout to the investors in the green category 124 will increase as well. If the payout adjustments 126 are assumed to be fixed, then the portfolio allocation 118 must be adjusted to match the overall increased rate of return paid to investors. Conversely, if the rate of return provided by the portfolio allocation 118 is assumed to be fixed, the payout adjustments 126 must be changed in view of the changes in the well-being categories 124. In this way it can be seen that solution of the investor payout model, the portfolio allocation model, and the risk classification model are interrelated and are to be jointly determined by optimization.

Optimization can be accomplished, for example, with the use of Monte Carlo simulations. The models may be optimized manually by starting with a set of assumptions from morbidity risk model and the morbidity migration model (which determine the proportion of investors in any given class at any given time period). One then assumes a given level of return and risk return in the portfolio (portfolio allocation model) and then calculates how to pay out each class of investor such that the sellers makes sufficient return on the capital provided by the investors. A number of commercial available optimization products are available, however, including QUANTUM XL from SigmaZone which is an add-on for Microsoft EXCEL, SAS and others that automate the optimization processes. Using this or a similar Monte Carlo simulators allows the user to input their beliefs about what is likely to happen in the morbidity risk model, morbidity migration model and portfolio allocation model (using probability distributions) and "find" solutions for the for investor payout and risk classification models, such that the seller can still be profitable in offering the Well-being Bond. Given the need for optimization, the large quantities of data to be evaluated, and the complexity of the inter-relations between the models, the above described processes and operations are necessarily conducted using computer systems.

Financial Products

Non-limiting examples of financial products implementing the disclosed methods include the following:

Stand alone investment vehicle: A Well-being Bond can be bought and sold as a stand-alone investment vehicle offered by banks, insurance or investment companies. The product could be sold as an alternative to CDs, bonds, mutual funds, or annuities. Individual investors would purchase the bond from the seller. The seller may manage the underlying portfolio of assets used to pay the Well-being Bonds, or alternatively, the seller may offer the bonds on behalf of another party which manages the underlying portfolio.

Sub account within a retirement plan or product: The Well-being Bond can be included within a 401(k), 403(b), 457, Roth, or traditional IRA offered by a bank, insurance or investment company. The disclosed models and methods could be applied to an existing investment product option in the plan or the Well-being Bond could be incorporated as a sub account investment option within the retirement product (similar to other indexed or variable sub accounts). By including the account in an IRS Qualified plan, contributions (from the employer, employee, or individual investor) can be made on a tax advantaged basis.

Sub-account within a life insurance product: The Well-being Bond can be included within a permanent Universal Life (UL) or Variable Universal Life (VUL) insurance product offered by an insurance company. Within a UL policy the disclosed models and methods could be used to tie the rate of return on the account value to improvements or deteriorations in health. In a VUL, the Well-being Bond could be a sub-account investment option.

Sub-account within an annuity: The Well-being Bond can be included within a deferred variable or fixed annuity product offered by an insurance company. The models could be used to tie the rate of return during the accumulation phase of a fixed annuity to improvements or deteriorations in health. As a sub-account within a deferred variable annuity the account would be selected vis-à-vis other sub accounts.

Example Investment

Investor A, a male, purchases a $1000 investment product in 2010. The investment provides a fixed 5% rate of return with the incentives shown in Table 2. The money is invested in a portfolio as determined by the portfolio allocation module 108. The portfolio is expected to return 6% annually. The initial investment period is 5 years.

At the time of investment, Investor A is 41. Health measures $X_1, X_2, \ldots, X_n$ are taken and the morbidity risk module 102 determines a morbidity risk score, Y, for Investor A. The risk classification module 104 determines that Investor A is in the green well-being category 124. In 2015, health measures $X'_1, X'_2, \ldots, X'_n$ are assessed for Investor A. These health measures can be the same or different from those taken in 2010. Investor A is now 46 and thus different health measures may be used in predicting the morbidity risk score. Investor A's health has deteriorated and his well-being category 124 is now yellow. Thus Investor A is paid a 4.5% compounded rate of return applied retrospectively to the $1000 investment for the five-year period. Investor A chooses to continue investing and his health is reassessed every five years. In 2045, when Investor A is 76, health measures $X''_1, X''_2, \ldots, X''_n$ are taken. Again, these can be the same or different as the health measures used previously. As Investor A is now 76, it is likely that the health measures are different from those used when Investor A was younger. Similarly, the thresholds between green, yellow and red well-being categories 124 are age-adjusted for each investor and thus likely to be different because Investor A is so much older now. At 76, Investor A's well-being category 124 is back to green after having been at yellow five years earlier. Thus, Investor A is paid 5.5% (the 5% base+ 0.5%) rate of return applied retrospectively.

In this description, the term "module" refers to computational logic and data for providing the specified functionality. A module can be implemented in hardware, firmware, and/or software. Where the modules described herein are implemented as software, the modules can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the system 100, loaded into memory, and executed by the one or more processors of the system's computers.

The particular division of functionality between the various components may differ from that described herein, given the variety of software development environments and hardware platforms that may be used to practice the invention. Thus, the particular functions of the various above describe components may be provided in more or fewer elements. Also, the various modules may be implemented in a variety of modes, including a neural network, a multivariate regression model, or any other model which classifies inputs based on statistical analysis of historical data. Accordingly, the disclosure of the present invention is intended to be illustrative, but not limiting, of the scope of the invention, which is set forth in the following claims.

It is not necessary for the elements to be organized as shown; the elements can be hosted by other entities or in some cases may even stand-alone. In some implementations of the system, the various elements may also appear in different configurations. Furthermore, it is not necessary for every embodiment of the invention to include all of the elements depicted. Likewise, as other elements and sub-elements are described throughout the invention, it should be understood that various embodiments of the invention may exclude elements and sub-elements described, that the elements and sub-elements may be hosted in configurations other than those shown, and that elements and sub-elements, even within an element, may be hosted in different locations or by different entities than those shown.

The particular naming of the components, capitalization of terms, the attributes, data structures, or any other programming or structural aspect is not mandatory or significant, and the mechanisms that implement the invention or its features may have different names, formats, or protocols.

Some portions of the above description describe the invention in terms of algorithms and symbolic representations of operations on information. These algorithmic descriptions and representations are the means used by those skilled in the data processing arts to most effectively convey the substance of their work to others skilled in the art. These operations, while described functionally, computationally, or logically, are understood to be implemented by computer programs or equivalent electrical circuits, microcode, or the like.

The terms used to describe various quantities, data values, and computations are understood to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method of determining an adjustment to a rate of return for a financial product offered to an investor, comprising:
   accessing by a computer a base rate of return for the investor for an investment in the financial product at the end of a time period of the investment;
   accessing by a computer a plurality of stored health measures of the investor, the health measures indicative of the health of the investor at the end of time period;
   determining at least at the end of the time period a well-being category for the investor based upon the accessed health measures of the investor; and
   determining an adjustment to the base rate of return to be retrospectively applied to the investment based on the well-being category.

2. The method of claim 1, wherein determining a well-being category for the investor comprises:
   applying the investor's health measures to a morbidity risk model to determine a morbidity risk associated with the investor's health measures; and
   applying the morbidity risk to a risk classification model that associates morbidity risk measures with a plurality of well-being categories, to determine the well-being category for the investor.

3. The method of claim 1, wherein the well-being categories comprise:
   a good health category corresponding to a low level of morbidity risk;
   an average health category corresponding to a medium level of morbidity risk; and
   a poor health category corresponding to a high level of morbidity risk.

4. The method of claim 1, wherein the financial product is a stand alone investment product that can be purchased by the investor from the seller.

5. The method of claim 1, wherein the financial product is included within a Qualified Plan.

6. The method of claim 1, wherein the financial product is included as part of an insurance product.

7. The method of claim 1, wherein the financial product is included as part of an annuity product.

8. A method of providing a financial product to a population of investors, comprising:
- generating by a computer a morbidity risk model relating objective measures of human health to measures of morbidity risk, and storing the morbidity risk model in a computer storage device;
- generating a risk classification model by the computer from the morbidity risk measures that classifies different measures of morbidity risk into a plurality well-being categories, wherein investors in the financial product will be assigned to different ones of the well-being categories, and storing the risk classification model in the computer storage device;
- generating a morbidity risk migration model by the computer that predicts changes over a time period in a distribution of investors assigned to the different ones of the well-being categories, and storing the morbidity risk migration model in the computer storage device;
- generating a payout model by the computer that specifies adjustments to a base rate of return for the financial product held by the investor based on an investor's migration between well-being categories during the time period, and storing the payout model in the computer storage device; and
- generating a portfolio allocation model by the computer for establishing an asset allocation for a portfolio of assets to have an expected yield greater than expected rates of returns to the investors of the financial product over the time period, based on the risk classification model, the payout model, and the morbidity risk migration model, wherein the risk classification model, the payout model, and the portfolio allocation model are jointly optimized, and storing the portfolio allocation model in the computer storage device.

9. The method of claim 8 wherein each well-being category is associated with one of a plurality of base rates of return for the financial product held by the investor.

10. A financial product for an individual investor, comprising:
- a principle portion invested by the investor for a time period;
- a base rate of return for the time period;
- a predetermined set of potential adjustments to the base rate of return, that can be individually applied retrospectively after each time period the investment is held, the adjustments including:
  - at least one increase in the base rate of return corresponding to an improvement in the investor's well-being category at the end of the time period relative to the investor's initial well-being category, the initial well-being category selected from a plurality of well-being categories and based upon health measures of the investor at a time of the investment by the investor; and
  - at least one decrease in the base rate of return corresponding to a decline in the investor's well-being category at the end of the time period relative to the investor's initial well-being category.

11. A computer system for providing financial products to investors, the computer system comprising at least one computer configured to persistently store and execute:
- a morbidity risk model relating objective measures of human health to measures of morbidity risk;
- a risk classification model that classifies different measures of morbidity risk into a plurality of well-being categories, wherein investors in the financial product will be assigned to different ones of the well-being categories;
- a morbidity risk migration model that predicts changes over a time period in a distribution of investors assigned to the different ones of the well-being categories;
- a payout model that specifies adjustments to a base rate of return for the financial product held by the investor based on an investor's migration between well-being categories during the time period; and
- a portfolio allocation model for establishing an asset allocation for a portfolio of assets to have an expected yield greater than expected rates of returns to the investors of the financial product over the time period, based on the risk classification model, the payout model, and the morbidity risk migration model, wherein the risk classification model, the payout model, and the portfolio allocation model are jointly optimized by the computer system.

12. The computer system of claim 11 wherein each well-being category is associated with one of a plurality of base rates of return for the financial product held by the investor.

13. A computer program product stored on a computer readable, tangible storage medium, for providing financial products to investors, the computer program product persistently storing computer executable code to be executed by processor(s) to perform the steps of:
- generating a morbidity risk model relating objective measures of human health to measures of morbidity risk;
- generating a risk classification model from the morbidity risk measures that classifies different measures of morbidity risk into a plurality of well-being categories, wherein investors in the financial product will be assigned to different ones of the well-being categories, and wherein each well-being category is associated with base rate of return for the financial product held by an investor;
- generating a morbidity risk migration model that predicts changes over a time period in the distribution of investors assigned to the different ones of the well-being categories;
- generating a payout model that specifies adjustments to the base rates of returns for the well-being categories, based on an investor's migration between well-being categories during the time period; and
- generating a portfolio allocation model for establishing an asset allocation for a portfolio of assets to have an expected yield greater than expected rates of returns to the investors of the financial product over the time period, based on the risk classification model, the payout model, and the morbidity risk migration model, wherein the risk classification model, the payout model, and the portfolio allocation model are jointly optimized.

14. The method of claim 1 wherein the base rate of return is determined by:
- accessing by a computer a plurality of stored initial health measures of the investor making the investment, the health measures indicative of the health of the investor at the time of the investment;
- determining by the computer an initial well-being category for the investor based upon the accessed initial health measures; and determining a base rate of return for the financial product for a time period of the investment based on the initial well-being category.

\* \* \* \* \*